Patented Nov. 10, 1925.

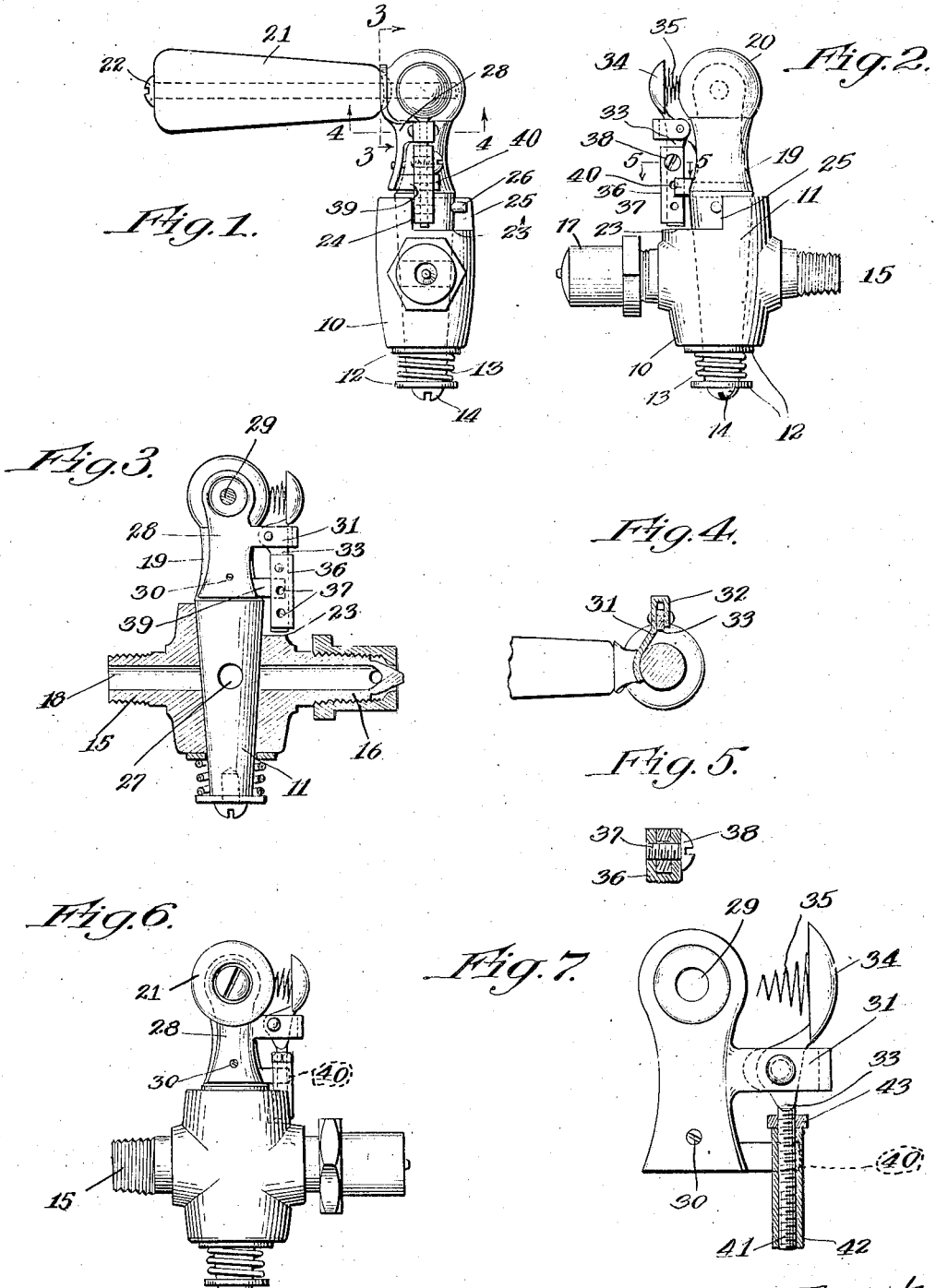

1,561,059

UNITED STATES PATENT OFFICE.

GOLFRED DANKO, OF CHICAGO, ILLINOIS.

VALVE LOCK.

Application filed May 6, 1925. Serial No. 28,487.

*To all whom it may concern:*

Be it known that I, GOLFRED DANKO, a citizen of Poland, residing at Chicago, in the county of Cook and State of Illinois, have invented certain new and useful Improvements in Valve Locks, of which the following is a specification.

The invention relates to valve locks, and has particular application in valves in gas ranges and stoves, to guard against inadvertent opening of the valve, the main object of the invention being the provision of an adjustable lock fitting various lengths of valve stems.

Another object of the invention is to improve the construction of locks of the character stated.

With the above general objects in view and others that will appear as the nature of the invention is better understood, the same consists in the novel construction, combination and arrangement of parts hereinafter more fully described, illustrated in the accompanying drawing and pointed out in the appended claims.

In the drawing forming a part of this application, and in which like designating characters refer to corresponding parts throughout the several views, Fig. 1 is an elevational view of the lock as applied to the valve stem and casing in ordinary gas range;

Fig. 2 is a view similar to that of Fig. 1 showing the invention from a different angle;

Fig. 3 is a longitudinal cross-sectional view through the valve stem and casing taken on line 3—3 of Fig. 1;

Fig. 4 is a cross-sectional view on line 4—4 of Fig. 1 showing a detail of the invention;

Fig. 5 is a cross-sectional view on line 5—5 of Fig. 2;

Fig. 6 is an elevational view of the valve casing and stem showing a modified form of the invention cooperating therewith; and Fig. 7 is an enlarged view, partly in elevation and partly in section, showing the modified form of the invention.

Referring in detail to the drawing there is shown a valve casing 10 having a tapered bore for receiving therewithin valve plug 11. Said valve plug is held in position within the valve casing by means of washers 12, spring 13 interposed between said washers, and screw 14.

The valve casing is provided with externally threaded projection 15 by means of which the valve casing is adjusted upon a manifold. A nozzle 16 is provided at an opposite point of the valve casing and is adapted to receive a regulating thimble 17 through which gas is supplied to the burner.

Transversely of the casing 10 and through the projection 15 and nozzle 16 there is a bore 18 supplying the gas from the manifold, said valve plug 11 being in the path of said bore for opening or closing the bore as is obvious.

The valve plug 11 has a shank 19 and head 20 to which a handle 21 is secured by means of screw 22. Near the upper end of valve plug 11 and adjacent said shank 19 the casing 10 has an arcuate notch 23 terminating with walls 24 and 25. Said walls limit the rotary movement of the valve plug 11 within the tapered bore in the casing 10 through the medium of pin 26 formed on the valve plug 11 and remaining within the notch 23. When said pin 26 abuts the wall 25, as shown on Figs. 2 and 3, the valve plug blocks the bore 18 and thus shuts off the supply of gas therethrough. When said pin remains close to wall 24 the bore 27 in the valve plug 11 registers with the bore 18 and permits the passage of the gas through the valve casing 10 to the burner.

All the parts heretofore referred to are of the usual construction.

My invention embodies a plate 28 suitably formed to overlie shank 19 and head 20. The part of the plate adjacent the head 20 is provided with aperture 29 for the purpose of passing screw 22 therethrough, said part remaining interposed between head 20 and handle 21 and by means of screw 22 being clamped to the head 20. The lower part of the plate 28 is provided with a screw 30, which, bearing against shank 19, prevents shifting of the plate 28 during the clamping process of the plate by screw 22.

Plate 28, at the upper end of shank 19 and adjacent the head 20, has an integrally formed extension 31 which is bent toward the shank 19 to form a U-shaped clamp 32, as plainly seen on Fig. 4, within which lever 33 is pivoted. The outer end of said lever is provided with a cup-shaped head 34 within which a coil spring 35 is mounted and which remains interposed between said cup-shaped head 34 and head 20 of the valve plug 11.

The other end of lever 33 carries an extensible sheath 36 having a series of apertures 37. Said end of lever 33 is likewise provided with a series of apertures as plainly seen on Fig. 1 for extending the sheath beyond the end of the lever and affixing it thereto by means of a screw such as 38.

The lower portion of plate 28 is provided with a similar extension 39 which passes below the lever 33 and terminates in an outwardly projecting lug or flange 40 which abuts the adjacent wall of sheath 36.

The modified form of the invention, shown on Figs. 6 and 7, comprises all the parts embodied in the preferred form of the invention with the exception that the lever 33 has a round threaded portion 41 adapted to receive the tubular sheath 42 threadedly adjustable upon portion 41. A lock nut 43 prevents the creeping movement of said tubular sheath 42.

When the valve is closed the lever 33 with the sheath 36 or 42 remains close to the wall 24 in the notch 23, preventing the rotary movement of the valve plug 11 and consequently the angular movement of handle 21. In order to open the valve the cup-shaped head 34 must be pressed against the tension of spring 35 toward the head 20. This operation elevates the lever 33 with its sheath and when said lever is beyond the wall of the casing, that is removed from abutment with wall 24, the handle 21 may be turned and valve opened. When the valve is opened the lever 33 rests upon the outer wall of casing 10, and pin 26 comes in abutment with wall 24. Further movement of the handle will be prevented due to said abutment of pin 26 against the wall 24.

On turning handle 21 in the opposite direction from that mentioned in order to close the valve, the lever 33 with its sheath 36 or 42 will ride upon the casing and as it comes into the path of notch 26 will drop into said notch owing to the pressure exerted by the spring 35 at the head 34, and will assume the position illustrated on Fig. 1.

The purpose of the extension 39 and lug 40 is to guard lever 33 against bending on its pivot point within clamp 32 which would otherwise ensue on accidentally turning the handle 21 without first raising the lever 33 by pressing on head 34 preparatory to turning said handle.

The present invention is designed to be used in connection with various sizes of valve-plugs 11 and shanks 19. For this purpose sheath 36 or 42 may be extended so as to make lever 33 longer to correspond with the length of shank 19 as is obvious.

While there is described herein a preferred embodiment of the present invention, it is nevertheless to be understood that minor changes may be made therein without departing from the spirit and scope of the invention as claimed.

What I claim as new is:

1. In a valve lock cooperating with a valve casing and a valve-plug therewithin, a plate fitted upon said valve-plug, an extension upon said plate, a lever pivoted in said extension, said lever normally engaging the valve casing to hold the valve closed, and means cooperating with said plate and said lever for preventing bending of said lever on its pivot point in attempting to operate the valve-plug without first releasing the engagement of said lever with the valve casing.

2. In a valve lock cooperating with a valve casing and a valve-plug therewithin, a plate fitted upon said valve-plug, an extension upon said plate, a lever pivoted in said extension, said lever normally engaging the valve casing to hold the valve closed (another extension upon said plate, and a flange upon said last named extension, said flange abutting said lever for preventing bending thereof on its pivot point in attempting to operate the valve-plug without first releasing the engagement of said lever with the valve casing.

3. In a valve casing and a valve-plug cooperating therewith, said casing having a notch, the combination of a plate upon said valve-plug, a lever associated with said plate, and an extensible sheath upon said lever, said sheath fitting within said notch for holding the valve-plug against rotation.

4. In a valve casing and a valve-plug cooperating therewith, said casing having a notch, the combination of a plate upon said valve-plug, an extension upon said plate, a lever pivoted within said extension, said lever normally engaging the valve casing to hold the valve closed, another extension upon said plate, a flange upon said last named extension, said flange abutting said lever for preventing bending of said lever on its pivot point in attempting to operate said valve-plug without first releasing the engagement of said lever with the valve casing, and an extensible sheath upon said lever fitting within said notch.

In testimony whereof I affix my signature.

GOLFRED DANKO.